INVENTOR.
ROBERT L. CHENEY

June 6, 1967  R. L. CHENEY  3,324,394
ADJUSTABLE MOUNTING SUPPORT FOR ROD-SHAPED MIRROR GALVANOMETER
TYPE INSTRUMENT
Filed Feb. 11, 1963  2 Sheets-Sheet 2
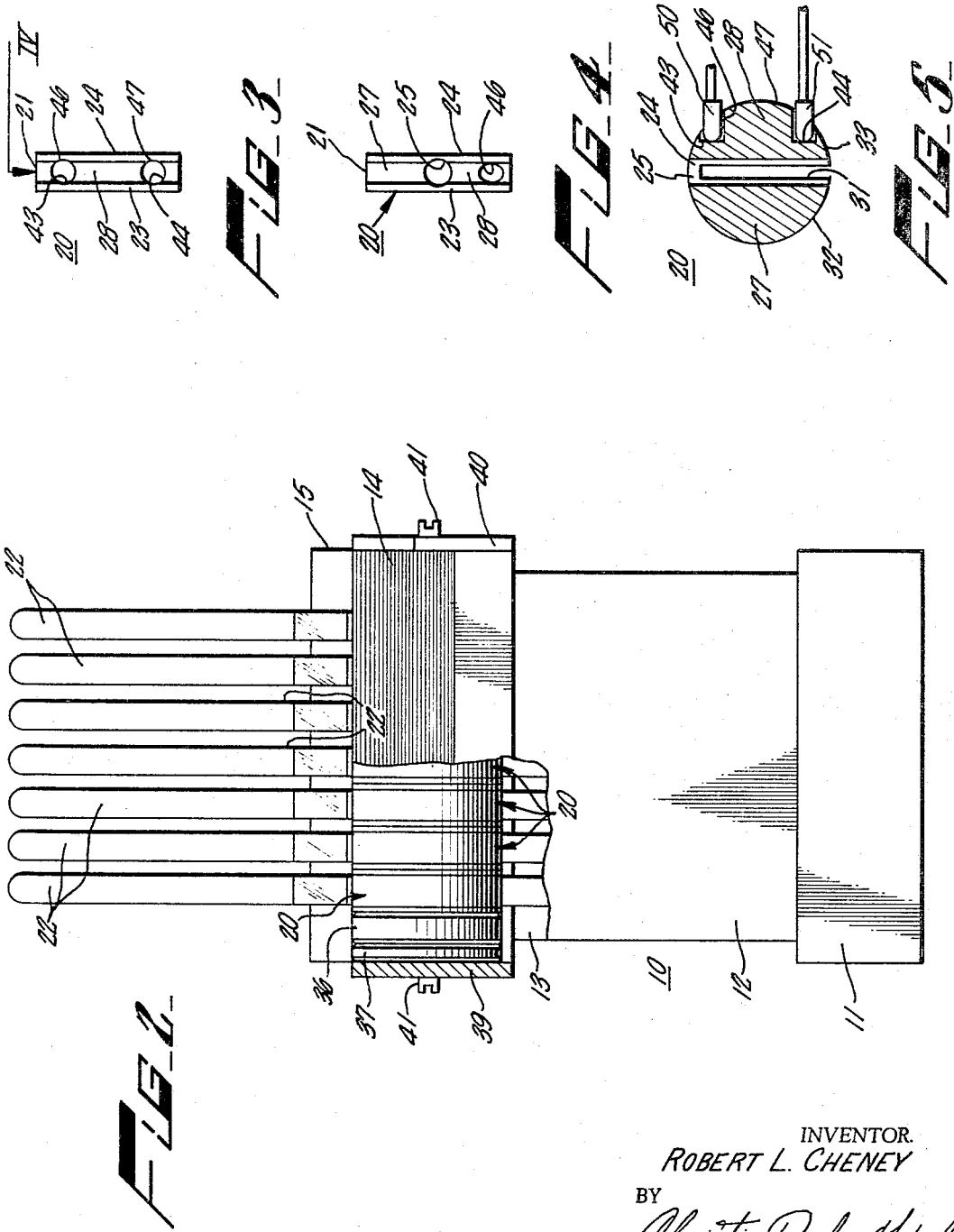
INVENTOR.
ROBERT L. CHENEY
BY
Christie, Parker & Hale
ATTORNEYS

United States Patent Office 3,324,394
Patented June 6, 1967

3,324,394
ADJUSTABLE MOUNTING SUPPORT FOR ROD-SHAPED MIRROR GALVANOMETER TYPE INSTRUMENT
Robert L. Cheney, Arcadia, Calif., assignor to Consolidated Electrodynamics Corporation, Pasadena, Calif., a corporation of California
Filed Feb. 11, 1963, Ser. No. 257,405
3 Claims. (Cl. 324—97)

The present invention relates to mounting structure and apparatus and, more particularly, to apparatus for mounting rod-shaped instruments, such as pencil type galvanometers, and to galvanometer blocks and similar apparatus.

In recent years, various types of galvanometers have been developed to fill the need for such instruments in multi-track oscillograph apparatus. One such development led to a galvanometer instrument that has the configuration of a relatively thin rod and is commonly referred to as "pencil type galvanometer." Galvanometers of this latter type are well known. They usually comprise a thin tube which houses the galvanometer system including the deflecting mirror. A wall portion of the tube adjacent the galvanometer mirror is provided with a transparent window so that a beam of light may reach the mirror, be reflected thereon and impinge on a piece of light-sensitive recording paper. During operation of the galvanometer, it is important that the galvanometer mirror be positioned so that the light beam that is reflected therefrom will impinge exactly on the intended track on the multi-track recording paper. Existing structures attempt to effect this adjustment by tilting each galvanometer relative to the galvanometer block until the reflected beam impinges at the correct spot on the recording paper. Known structures for effecting such tilting are generally inconvenient to operate, give inaccurate adjustments or require the manipulation of adjusting devices ahead of the aforesaid window so that the light beam is obstructed during adjustment and cannot be observed to determine the moment of correct adjustment.

The subject invention overcomes these disadvantages and provides an apparatus which comprises a circular mounting member defining a bore extending substantially along a diameter thereof for receiving a rod-shaped instrument, such as a pencil type galvanometer, and a mounting structure, such as a galvanometer block, mounting the circular member for angular or rotary movement relative thereto. According to the invention, the circular mounting member is provided with a pair of spaced shoulder portions which are both located at the periphery of the circular member and to one side of the aforesaid diameter or, in other words, to one side of the instrument when inserted in the circular mounting member. A pair of plungers or similar elements are associated with the aforesaid mounting structure. These plungers are adjustable and one of them serves to engage one of the shoulder portions on the circular member to move the circular member angularly in one direction, while the other plunger engages the remaining shoulder portion to move the circular member angularly in the opposite direction. In this manner, the galvanometer instruments and their mirrors can be readily tilted and adjusted to their correct position without any complicated manipulations or any obstruction of the light beams being necessary, as will be more fully appreciated as the description proceeds.

In a particularly advantageous embodiment, the circular mounting member is shaped to define a pair of interconnected mounting or gripping elements for releasably retaining the inserted instrument therebetween. As will subsequently be shown, adjustment of the above-mentioned plungers will also cause these mounting elements to grip the inserted instrument so that dislocation thereof during operation is avoided.

The invention will become more readily apparent from the following detailed description of a preferred embodiment thereof illustrated by way of example in the accompanying drawings, in which:

FIG. 2 shows an elevation, partially in section, of the apparatus shown in FIG. 1 as seen in the direction of arrow II indicated in FIG. 1;

FIG. 3 shows an element of the apparatus shown in FIGS. 1 and 2;

FIG. 4 shows a view of the element of FIG. 3 as seen in the direction of arrow IV indicated in FIG. 3; and FIG. 5 shows a section through the element illustrated in FIGS. 3 and 4 as seen in FIG. 1, with associated parts.

Figure 1:
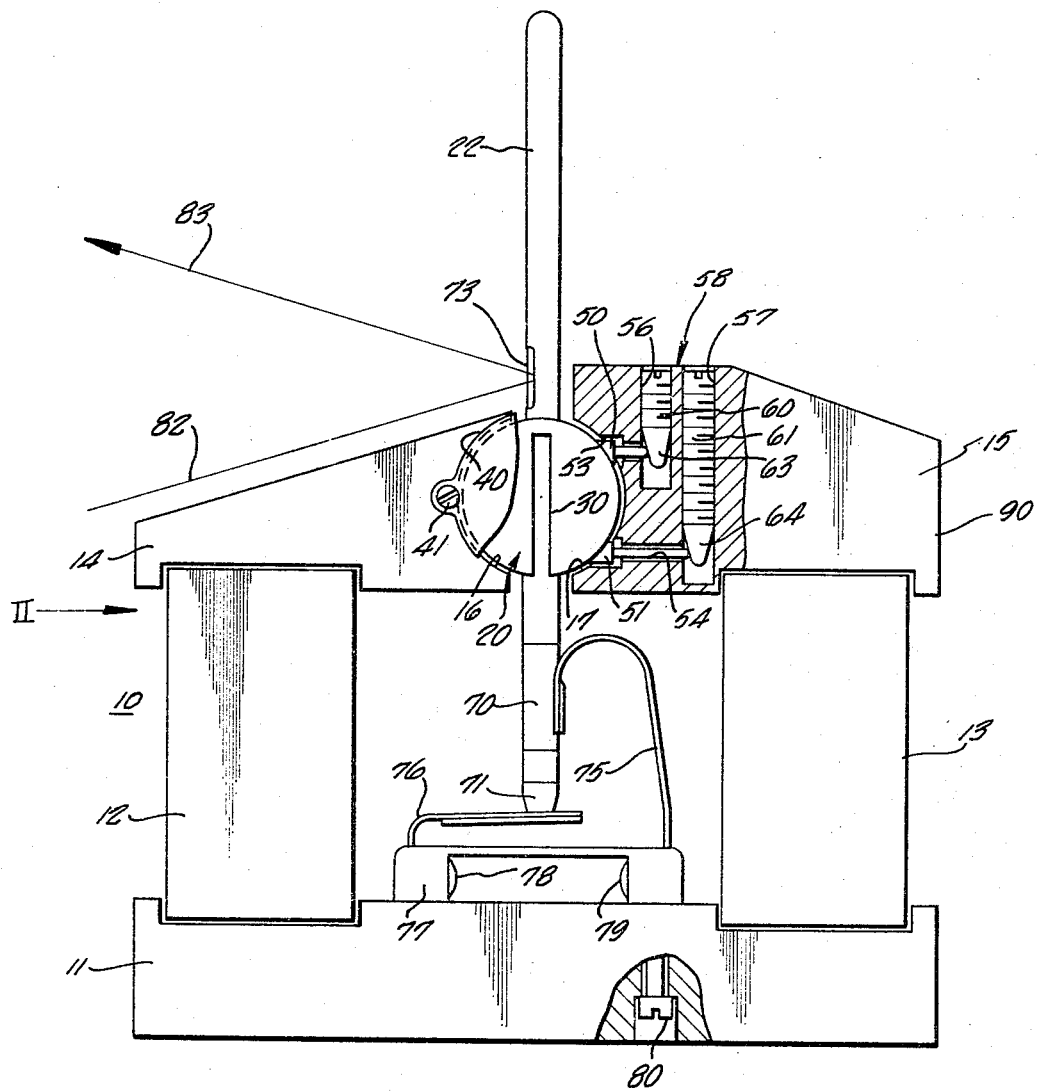
FIG. 1 shows a side view, partially in section, of an apparatus embodying the invention.

The galvanometer block 10 shown in FIGS. 1 and 2 comprises a base 11 of a suitable, soft iron, a pair of permanent magnets 12 and 13, a pair of pole plates 14 and 15 of a suitable soft iron. Pole plate 14 defines a bearing surface 16 and pole plate 15 a bearing surface 17. Pole plates 14 and 15 mount a plurality of circular mounting members 20 for angular or rotary movement between bearing surfaces 16 and 17.

Each circular member 20 is composed of an inner layer 21 of magnetic material, such as a suitable soft iron, and a pair of outer layers 23 and 24 of a resilient, non-magnetic material, such as a suitable copper alloy. Layers 23 and 24 are bonded to center layer 21. Each circular member 20 has a bore 25 extending substantially along a diameter thereof for receiving a galvanometer instrument 21. The diameter of bore 25 is chosen so that the magnetic center layer 21 is divided into a pair of pole pieces 27 and 28 which are magnetized by magnets 12 and 13 through pole plates 14 and 15 and which supply magnetic flux to the galvanometer system (not shown) inside of instrument 22. A slot 30 (see FIG. 1) is provided in outer layer 23 and a corresponding slot 31 (see FIG. 5) in outer layer 24 so that circular member 20 defines a pair of interconnected mounting or gripping elements 32 and 33 (see FIG. 5) for releasably retaining an instrument 22 therebetween. An end washer 36 and a spring disc 37 are inserted at one end of the stack of circular members 20 (see FIG. 2). An end washer similar to washer 36 and a spring disc similar to disc 37 are also inserted at the other end of such stack, but are not shown in the drawings. The stack is mounted against lateral movement by a pair of end plates 39 and 40 removably secured to pole plates 14 and 15 by screws 41. The end washers, the discs 37 and end plates 40 are, of course, of non-magnetic material. It will be noted that the aforesaid end washer and resilient disc have not been shown in FIG. 1 and that end plates 40 has been partially broken away therein to show other essential parts.

As is apparent from FIG. 5, each circular member 20 defines a pair of spaced shoulder portions 43 and 44 which are both located to one side of the diameter along which bore 25 extends. In addition to being to one side of this latter diameter, shoulder portion 43 is also located to one side of a radius extending perpendicularly to such diameter and shoulder portion 44 is located to the other side of this radius. In the subject embodiment, shoulder portions 43 and 44 are formed by driving two bores 46 and 47 into member 20.

A plunger element 50 is inserted into bore 46 so as to contact shoulder portion 43, and a plunger element 51 is inserted into bore 47 so as to contact shoulder portion 44 (see FIG. 5). Plungers 50 and 51 are inserted into bores 53 and 54 in pole plate 15. A partially threaded bore 56 extends from a region 58 behind instrument 22 down to and slightly beyond bore 53 and a partially threaded bore 57 extends from such region 58 down to and slightly beyond bore 54. An adjustment screw 60 is inserted in bore 56 and an adjustment screw 61 in bore 57. Screw 60 has a substantially conical end portion 63 and screw 61 a substantially conical end portion 64. End portion 63 contacts plunger element 50 so that plunger element 50 tends to be driven to the left as seen in FIG. 1 when screw 60 is driven into bore 56. End portion 64 contacts plunger element 51 so that plunger element 51 tends to be driven also to the left as seen in FIG. 1 when screw 61 is driven into bore 57. Considering this arrangement, it will be readily appreciated that circular member 20 can be moved angularly in a clockwise direction and in a counterclockwise direction by suitable adjustment of screws 60 and 61. In addition, screws 60 and 61 can also be adjusted so that the plungers 50 and 51 cooperate to compress the two gripping elements 32 and 33 of circular member 20 toward each other, whereby an inserted galvanometer instrument 22 is securely retained therebetween.

It will, of course, be understood that each circular member 20 has a pair of plungers 50 and 51 and a pair of adjusting screws 60 and 61 associated therewith in the manner shown in FIG. 1 for one of the circular members 20.

Preparatory to operation of the oscillograph comprising galvanometer block 10, a pencil type galvanometer 22 is inserted in each circular member 20. As is well known, galvanometer instruments of this type have a pair of input terminals 70 and 71 for the galvanometer system and a window 73 adjacent the mirror comprised in such galvanometer system (not shown). In the subject embodiment, a pair of contact springs 75 and 76 mounted on a terminal block 77 establish contact between a pair of stationary terminals 78 and 79 and the galvanometer terminals 70 and 71. Terminal block 77 is mounted on base 11 by means of a plurality of bolts, one of which is shown in FIG. 1 at 80. Terminal block 77 also carries the stationary terminals and contact springs (not shown) for the remaining galvanometer instrument.

For adjustment purposes, a beam or ray of light indicated in FIG. 1 at 82 is projected through window 73 onto the mirror (not shown) of the galvanometer instrument. Such beam 82 is reflected by the mirror and leaves window 73 as reflected beam 83. Reflected beam 83 is projected into a suitable surface, preferably onto the roll of recording paper (not shown) which is customarily employed in recording oscillographs. Screws 60 and 61 are then adjusted until instrument 22 is securely held against unintended displacement in its associated circular member 20 and until the reflected beam 83 impinges exactly on the track allocated on the recording paper for the particular instrument 22. Tightening of screw 60 will cause instrument 22 to be tilted counterclockwise as seen in FIG. 1, while tightening of screw 61 will cause instrument 22 to be tilted clockwise. In this manner, the position of instrument 22 can be adjusted until the angle of reflected beam 83 relative to beam 82 is neither too small nor too large.

A similar adjustment will, of course, be effected for the remaining instruments 22 until the oscillograph is ready for operation during which input signals applied to the terminals of each instrument will cause the particular galvanometer mirror to oscillate, as is well known.

It will now be seen that the invention provides improved means for mounting various types of rod-shaped instruments which permit convenient adjustment of the mounted instruments. All instruments can be adjusted from the same side thereof. This is particularly important in the case of a galvanometer block where it is essential that the light beams be not obstructed during adjustment, since this would largely complicate the adjustment operation.

While the magnets 12 and 13 would normally retain the pole plates 14 and 15 and associated structure in place, mounting and housing means (not shown) may be and usually are employed to accomplish this purpose and to provide a housing for block 10. In addition, a thermostatically controlled heating system (not shown) is usually associated with galvanometer block 10 to insure accurate operation thereof.

In principle, it would of course be possible to have plunger elements 50 and 51 and screws 60 and 61 extend to the rear surface 90 of pole plate 15 so that the position of instrument 22 is adjustable from such rear surface. However, in many instances it will be found that the arrangement shown in FIG. 1 is more convenient, as it normally will interfere least with the aforesaid housing and heating means and will be most conveniently adjustable by the operator.

Moreover, while a galvanometer block has been illustrated and a recording oscillograph referred to, it will, of course, be understood that the apparatus and structure of the invention is readily adapted to other applications which employ rod-shaped instruments.

Various modifications within the scope of the invention will be apparent to those skilled in the art.

I claim:

1. Apparatus for adjustably mounting a rod-shaped optical instrument having a dark side and a light beam side comprising to vary the angle of a light beam emanating from the instrument:

(a) a substantially circular mounting member defining:
      a bore extending substantially along a first diameter of the mounting member for receiving the instrument,
      a pair of interconnected gripping elements for releasably retaining the instrument therebetween, a first shoulder portion on said mounting member located on the dark side of said first diameter and to one side of a second diameter of the mounting member extending substantially at right angles to the first diameter, and a second shoulder portion on said mounting member located on the dark side of said first diameter and to the opposite side of the second diameter, with said first and second shoulder portions extending substantially parallel to the first diameter;

(b) a mounting structure defining:
      a first concave bearing surface extending adjacent said circular member to the light beam side of said instrument,
      a second concave bearing surface extending adjacent said circular member to the dark side of said instrument,
      a first bore extending substantially parallel to said second diameter and opening through said second bearing surface at a location adjacent said first shoulder portion of the circular member, and a second bore extending substantially parallel to said second diameter and opening through said second bearing surface at a location adjacent said second shoulder portion of the circular member;

(c) a first adjustable plunger located in said first bore for engaging said first shoulder portion and moving the circular member angularly in one direction; and (d) a second adjustable plunger located in said second bore for engaging said second shoulder portion and moving the circular member angularly in the opposite direction and for compressing, in cooperation with the first plunger, said pair of gripping elements elements into gripping contact with the instrument.

2. In a galvanometer block for mounting a plurality of cylindrical, pencil type galvanometer instruments, each galvanometer instrument having a window in a wall portion thereof and a mirror associated with said window for defining a reflective light path at one side of the galvanometer instrument, the improvement, comprising:
  (a) a circular mounting member for each instrument defining:
    a bore extending substantially along a diameter of the circular member for receiving the instrument, a pair of interconnected gripping elements for releasably retaining the instrument therebetween, and a pair of spaced shoulder portions both extending substantially parallel to said diameter and being located to the side of the galvanometer instruments opposite said windows and light paths;
  (b) a magnetic mounting structure defining a pair of spaced magnetic poles for mounting the circular members for all instruments and supplying magnetic flux thereto;
  (c) a first plunger for each circular member mounted in said mounting structure to extend substantially at right angles to said diameter and to contact one of said shoulder portions;
  (d) a second plunger for each circular member mounted in said mounting structure to extend substantially at right angles to said diameter and to contact the other of said shoulder portions;
  (e) a first screw mounted in said mounting structure to be adjustable from a region located to one side of said diameter, the first screw having a substantially conical end portion in contact with said first plunger for causing the first plunger, upon adjustment of the first screw, to move the associated circular member angularly in one direction;
  (f) a second screw mounted in said mounting structure to be also adjustable from said region located to one side of said diameter, the second screw having a substantially conical end portion in contact with said second plunger for causing the second plunger, upon adjustment of the second screw, to move the associated circular member angularly in the opposite direction and to compress said pair of gripping elements, in cooperation with said first plunger, into gripping contact with the instrument located therebetween.

3. An apparatus for mounting a rod-shaped instrument according to claim 1, including
  (a) a first screw means associated with said mounting structure for adjusting the first plunger; and
  (b) a second screw means associated with said mounting structure for adjusting the second plunger.

References Cited
UNITED STATES PATENTS

| | | | |
|---|---|---|---|
| 2,389,081 | 11/1945 | Redmond | 324—154 |
| 2,873,429 | 2/1959 | Atchley | 324—97 X |
| 2,892,154 | 6/1959 | Johnson | 324—97 |

RUDOLPH V. ROLINEC, *Primary Examiner.*